United States Patent [19]
Ray

[11] Patent Number: 5,380,994
[45] Date of Patent: Jan. 10, 1995

[54] MICROCOMPUTER ADAPTED FOR INVENTORY CONTROL

[75] Inventor: William F. Ray, Huntsville, Ala.

[73] Assignee: Science and Technology, Inc., Huntsville, Ala.

[21] Appl. No.: 5,380

[22] Filed: Jan. 15, 1993

[51] Int. Cl.⁶ .................................................. G06F 7/10
[52] U.S. Cl. ...................................... 235/472; 235/375
[58] Field of Search ................................ 235/375, 472

[56] References Cited

U.S. PATENT DOCUMENTS

| | | | |
|---|---|---|---|
| 3,683,256 | 8/1972 | Mas | 320/14 |
| 3,796,940 | 3/1974 | Mauch et al. | 320/14 |
| 4,253,054 | 2/1981 | Steigerwald | 320/14 |
| 4,302,714 | 11/1981 | Yefsky | 320/14 |
| 4,401,935 | 8/1983 | Yerkes | 320/14 |
| 4,455,523 | 6/1984 | Koenck | 320/43 |
| 4,571,531 | 2/1986 | Lin | 320/14 |
| 4,672,293 | 6/1987 | Crampton | 320/14 |
| 4,877,949 | 10/1989 | Danielson et al. | 235/472 |
| 4,916,441 | 4/1990 | Gombrich | 235/472 |
| 4,970,379 | 11/1990 | Danstrom | 235/472 |
| 4,987,360 | 1/1991 | Thompson | 320/14 |
| 5,006,699 | 4/1991 | Felkner | 235/472 |
| 5,059,778 | 10/1991 | Zouzoulas | 235/472 |
| 5,159,258 | 10/1992 | Kolvites | 320/14 |
| 5,191,197 | 3/1993 | Metlitsky | 235/472 |
| 5,208,449 | 5/1993 | Eastman | 235/472 |
| 5,218,187 | 6/1993 | Koenck | 235/375 |
| 5,272,324 | 12/1993 | Blevins | 238/472 X |

Primary Examiner—Harold Pitts
Attorney, Agent, or Firm—John C. Garvin, Jr.; Harold W. Hilton

[57] ABSTRACT

A portable microcomputer inventory system including a plurality of components and a support for supporting the components on an user as the user inventories items that have a bar code disposed thereon. The components include a microcomputer, a handheld bar code scanner for scanning the bar code on items to be inventoried, a visual display device carried on the user to display information relative to the item being inventoried, a keypad for accessing the computer and a rechargeable battery pac for supplying electrical power to the components of the inventory system.

10 Claims, 2 Drawing Sheets

MICROCOMPUTER ADAPTED FOR INVENTORY CONTROL

FIELD OF THE INVENTION

This invention is generally directed to a portable microcomputer system and specifically to such a portable microcomputer system which can be strapped to the user to be carried by the user while in use during inventory procedures.

BACKGROUND OF THE INVENTION

Typical U.S. Government installations require extensive inventorying of furniture such as chairs, tables, bookcases, cost racks, etc., and equipment such as computers, desk lamps, typewriters, tools, etc. is required. Typically, the inventorying process requires an individual to enter rooms, labs, storerooms etc., where the items of interest are located, and manually recorded on paper these items at that particular location. This information was then entered on a master sheet along with information from current hand receipts to upgrade the inventory records. Such information included the Federal Stock Number, serial number, building, nomenclature, room location, date of last inventory, manufacturer's name, hand receipt holder number, component indicator and manufacturer's model number. A more recent method of inventory control is disclosed in U.S. Pat. No. 3,605,089 entitled "Physical Inventory Scanning and Recording System" issued to George W. Gray on Sep. 14, 1971. The apparatus of this patent is adapted to create a record which may be directly employed by high-speed data processing equipment. The system employs pressure sensitive transducers at the point of storage to continuously measure the weight of inventory items at the point of storage. From the output of the transducers, a record of current inventory is stored in a storage unit which is "on line" with a computer system and which can therefore be accessed quickly. The transducers are read by a scanning device and the information is recorded in a storage unit of the computer to create an inventory record.

Apparatus of the present invention includes a computer, a bar code scanner, an eye level monitor in the form of a headset, a keyboard and a power pack. The bar code scanner includes an internal decoder which receives the analog signal and converts it to a digital signal the computer can interpret along with a software interface driver which allows the keyboardbar code reader to intermix. Each of the above named components are detachably securable to the computer with unique connectors to prevent improper assembly.

Because the computer is provided with a large memory bank, a user taking inventory does not need to carry storage files or constantly refer to another computer. The computer as set forth herein can carry all of the pertinent information.

U.S. Pat. Nos. 4,884,219, 4,878,046, and 5,003,300 are directed to heads-up display systems attached to the users head and disposed for use with computers. U.S. Pat. No. 4,884,219 for example, discloses such a heads-up display device which permits the operator to effectively interact with a virtual model generated and graphically displayed by a computer. U.S. Pat. No. 4,878,046 is directed to a helmet mounted display with a cathode ray tube which generates images for the helmet mounted display. U.S. Pat. No. 5,003,300 is directed to a head mounted display for miniature video display systems and includes specific structure for positioning the display unit in front of either of the viewer's eyes.

Bar-code scanners are disclosed in U.S. Pat. No. 5,120,943 which discloses an electronic measuring system for receiving control signals for setting same, is set by a bar-code scanner through an encoder and processor utilizing instructions printed in bar-code form, so that the instruction can be accurately transferred to the microprocessor generating the control signals.

It is, therefore, an object of the present invention to provide a portable microcomputer system for inventory control.

It is a further object of the present invention to provide such a microcomputer system with visual read-out means, a bar-code scanner and a keyboard having a software-generated interface means to allow the keyboard and bar-code scanner to intermix.

It is yet a further object of the present invention to provide the visual read-out means in the form of a lightweight video display device which may be worn on the user's head.

These and other objects of the present invention will become more readily apparent from the following description and claims taken in conjunction with the accompanying drawings.

DESCRIPTION OF THE PREFERRED EMBODIMENT

Figure 1:
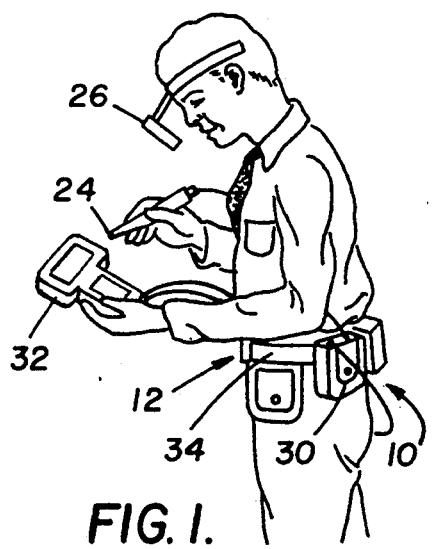
FIG. 1 is a pictorial view of a user wearing the inventory control system of the present invention.
Figure 2:
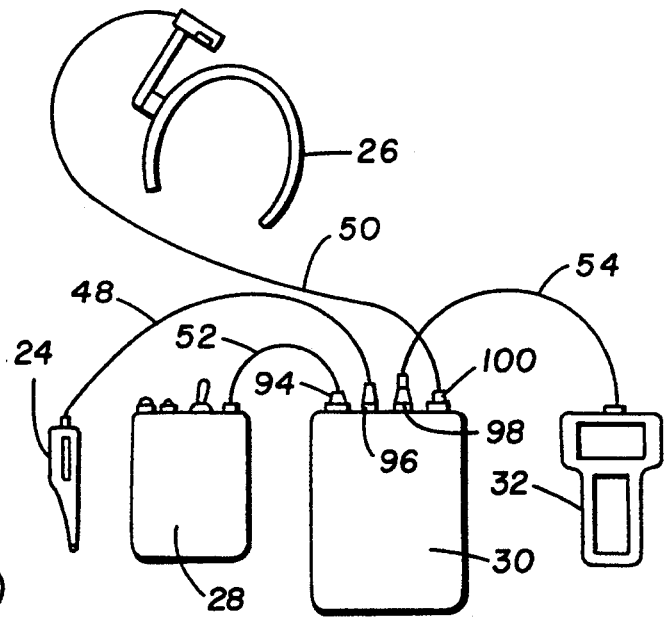
FIG. 2 is a pictorial view of the components of the microcomputer system of the present invention. The components are shown connected to the computer and include a bar-code scanner, a video display head set, a keypad and a power supply.

As seen in FIG. 1, a user is shown to have the microPortable Computer (mPC) system 10 of the present invention carried on his torso by a support belt 12 having individual compartments 14, 16, 18, 20 and 22 (FIG. 3) for respectively storing (FIG. 2) a bar-code scanner 24, a head-up display unit 26, a power pac 28, a computer 30, and a keypad 32.

Figure 3:
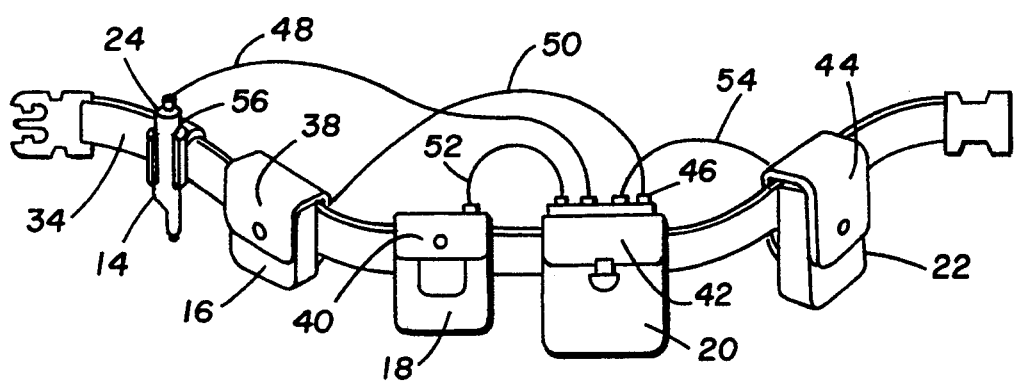
FIG. 3 is a pictorial view of the support belt which is worn around the user's waist to support the microcomputer system during use thereof.

Belt 12 is more clearly shown in FIG. 3 to include a belt strap 34 having the compartments 14, 16, 18, 20 and 22 in spaced relation along the strap 34 to respectively support the components 24, 26, 28, 30 and 32. Compartments 16, 18, 20 and 22 includes lids or covers 38, 40, 42 and 44 which are foldable over the components and are secured in the folded position by snaps, VELCRO, or any of many other types of fasteners. Compartment 14, while not illustrated as having a lid, may be provided with a lid, if desired. An opening 46 is provided in the lid 42 of compartment 20 through which electrical leads 48, 50, 52 and 54 extend from the computer 30 and respectively connect to the bar code scanner 24, video monitor 26, power pac 28 and the keypad 32. The bar code scanner 24 is shown to be mounted in a sheath-like compartment 14 which has an opening 56 at the top. Alternate configurations may be resorted to in order to accommodate bar code scanners of other configurations, if desired.

Figure 4:
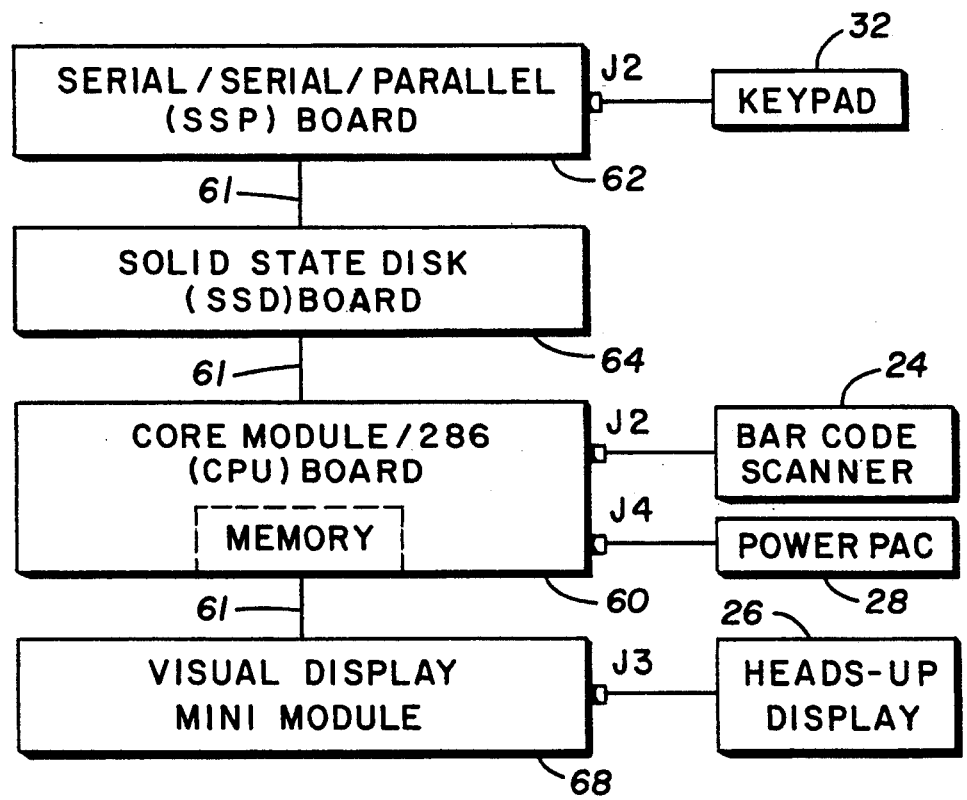
FIG. 4 is a block diagram of the portable microprocessor system of FIG. 1.

The computer is very compact lightweight structure which may be easily carried by the user as described above. FIG. 4 is a block diagram of a computer adapted for use according to the present invention. The basic computer illustrated in FIG. 3 utilizes an AMPRO CoreModule 286 processor board and is described in "Full line catalog, Winter-Spring 1992" (incorporated herein by reference). The catalog is printed by AMPRO Computers, Inc., 990 Alamanor Avenue, Sunnyvale, Calif. 94086.

The computer, as used herein, includes the AMPRO CoreModule TM /286, 60 having AMPRO MiniModule TM /SSP, 62 and AMPRO MiniModule TM /SSD, 64 and AMPRO MiniModule TM /Private Eye TM, 68 connected thereto to provide the necessary circuitry to specifically enable the computer to operate and interact with the specific keypad, heads-up display, bar code scanner, power pac for the inventory control functions as set forth herein. Core module TM /286 is described on pages 16 and 17 of the catalog. Minimodule TM /SSP is described on pages 58 and 59 of the catalog, MiniModule TM /SSD is described on pages 62 and 63 of the above-identified catalog. The MiniModule TM /Private Eye TM is a display control circuit board which is described on pages 15 and 16 of AMPRO MiniModule*v* catalog M71001, October 1990 (incorporated herein by reference). As seen in the block diagram of FIG. 4, CoreModule 286, 60 has a Solid State Disk module 64 connected to it along with the Solid State Disk (SSD) module 64, the Serial (Serial) Parallel (SSP) module 62 and the Private Eye module, 68. Typically, the order in which these modules are stacked or inter-connected with respect to the CoreModule 286, 60 is not important or significant. AMPRO's MiniModule standard (PC/104) stack-through connector 61 (FIG. 4) successfully communicates to each connected module regardless of their order in assembling. However, to meet the specific packaging envelope and to minimize EPROM programming time, these modules, as set forth, were stacked using a specific order. The order of this assembly is as follows, starting with the first module at the bottom with the final, assembled module listed at the top:

1. MiniModule Private Eye, 68
2. MiniModule SSP, 62
3. MiniModule SSD, 64
4. CoreModule 286, 60

The bar code scanner, 24 is connected to the inventory system via a serial port, J2 on the CoreModule 286, 60. The power pac, 28 is connected to the computer of the inventory system via a utility port, J4 of CoreModule 286, 60 which in turns distributes 5 volt±10% throughout the system via the PC/104 interface. To provide a visual display, the Private Eye display 26 is connected to the J3 port of the MiniModule Private Eye, 68 which is connected to the CoreModule 286, 60 via the PC-104 interface connector 61. The heads-up display unit may be similar to the display unit manufactured by Reflection Technology under the name of "Private Eye" and disclosed in U.S. Pat. No. 5,003,300, discussed supra, however, other display units are available and can interface to the inventory system via a MiniModule/VGA (not shown, but functions in the same manner as the MiniModule Private Eye, 68).

The power pac (FIG. 5) consists of three (3) sections. The first section 70 includes five (5) 1.2 volt, 5 amphour, D-cell NICAD batteries 72 that is connected through a zener diode regulator comprised of a serially connected zener diode 74 and resistor 76 to develop a 5 volt regulated voltage to the mPC. The second section 78 of the supply is a connection to the battery charging system and includes a series connector resistor 80 and LED 82 across the battery leads. A diode 84 is connected in series with resistor 80. Each of the two systems is selected through a three (3) position toggle switch 86. All of the power pac electronics is contained in a housing 88. The third section 68 includes discharge connectors 90 and 92 connected directly across the battery leads, yet by-passing all other component circuits within this Power Pac 28.

Figure 5:
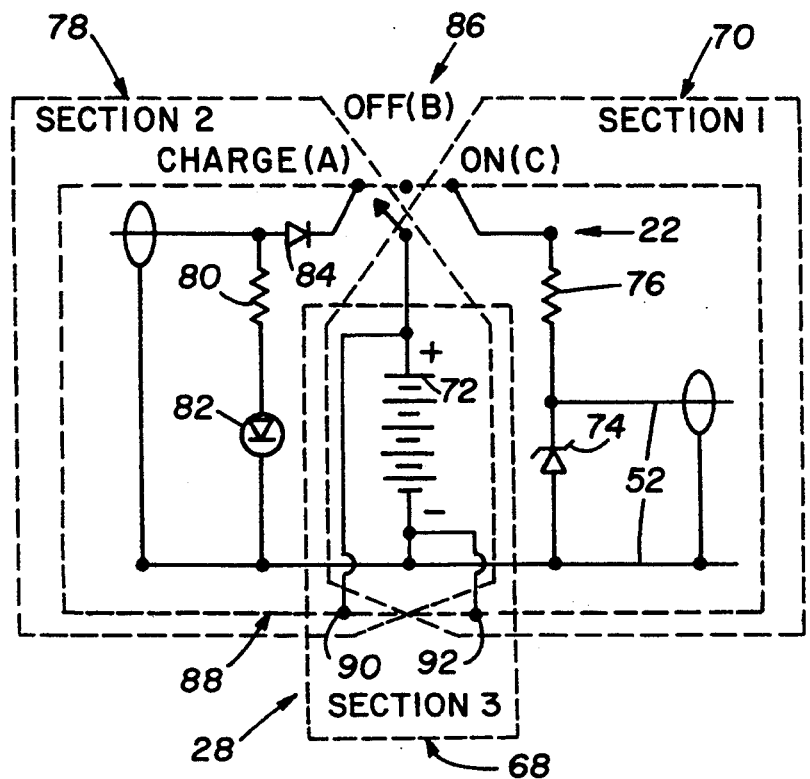
FIG. 5 is a schematic illustration of a power supply which may be used to supply power to the computer and other components of the system.

The three (3) position toggle switch 86 is provided on the housing 88 which encloses the batteries and associated wiring diagrammed in FIG. 5. The three positions of this switch are shown in FIG. 5 and are as follows:

Position A—Power Pac Charging Position
Position B—Inventory System Power Off
Position C—Inventory System Power On When the toggle switch is in Position C, the power is transferred from the power pac to the Inventory System via cable 52 to the CoreModule 286 utility port, J4.

The Power Pac 28 provides a unique design which prolongs the life of these NICAD batteries. Built-in discharge connectors 90 and 92 are provided so that prior to charging, these batteries can be discharged at an accelerated, yet safe, rate. By assuring the Power Pac 28 is completely discharged prior to charging, the charged life of this Power Pac 28 is maximized by minimizing the risk of introducing a less than optional amphour power ratio normal associated with NICAD batteries when they are overcharged. The associated charger/discharger system (not shown) includes the following:

1. Discharging circuitry: Artificially applies a safe load to the Power Pac 28 to completely discharg-/deplete its stored power.
2. Charging circuitry: Applies a safe but optimal power source to replenish/charge the Power Pac 28 to its full 5 amp-hour capacity.
3. Charging Timer: Prevents Power Pac 28 from overcharging by turning the charging circuitry off at a set, optimal time after charging a fully discharged Power Pac 28.

The bar-code scanner wand 24 is manufactured by TESCO International, Inc., Two (2) bar code laser scanners (not shown), manufactured by PSC, 770 Basket Rd., Webster, N.Y. (Models 5312 and 5390) can be substituted for the scanner wand 24, if desired. Both scanner types (laser & wand) include an internal analog to digital decoder and communicate/connect to the Inventory System's CoreModule 286, 60 via a 9 pin RS-232 serial port, J2. Using a bar code scanner software interface driver, both of these bar code scanner units allow keyboard/bar-code reader intermix. Both scanners read easily through plastic or lamination.

The hand-held portable keyboard 32 manufactured by Two Technology, Inc., 419 Sargon Way, Hotsham, Penn. 19044, includes an 80 column LCD (which allows for data entry verification and 38 keys modification of existing inventory records). However, it is to be understood that other types of keyboards may be used if desired. One such preferable type of keyboard is designed to be held by (and may strapped to) the user's hand and is operable by the tips of the fingers on the same hand which supports the keyboard. The cursor can be manipulatedmoved on the display by using an internal mouse included on this keyboard and is positioned by movement of the user's wrist which, in turn, moves the cursor in up, down and sideways directions. Such device is manufactured by Handykey Corp. under the name of TWIDDLER ™.

It should be noted that the mPC computer 30 (FIG. 2) is provided with connectors 94, 96, 98 and 100 which receive cables 52, 48, 54 and 50 for respectively connecting the Power Pac 28, bar code scanner 24, keypad 32 and heads-up display unit 26 to the mPC computer. Connector 94 is a 2 pin male power connector (microphone connector); connector 96 is a 9 pin RS-232 connector (female); connector 98 is a 9 pin RS-232 connector (male); connector 100 is a 9 pin miniature DIN connector (female). The utilization of the male and female connectors for the RS-232 connectors, 96 and 98, prevents the components from being erroneously connected.

The micro Portable Computer (mPC) of the present invention provides up to ½ megabyte of SRAM, ½ megabyte of EPROM up to 4MB of DRAM, 2 serial ports, 1 parallel port, an optional 14/21 MB harddrive unit, and 2 MB memory card readerwriter (not shown). An interconnect cable is provided for connection between connector J2 (FIG. 4) and the RS-232C port of another PC for data down-load/up-load operations.

The visual monitor is equivalent to a full size, 12 inch monitor yet weighs only 2 ounces and supports up to 640×200 pixels of graphics and 80 characters by 25 rows of text.

The bar code scanner wand has the following features:
1. Reads UPC/EANJAN, UPC/EAN Addendum, Codabar (Standard/ABC) Code-39 (Standard/full ASCII), Interleaved 2 of 5, Industrial 2 of 5, Std. 2 of 5, Code-11, and Code-93.
2. On/off switch and automatic shutoff.
3. Built-in beeper to indicate good read.
4. 0.125 mm (5 mil) high resolution.
5. Reads accurately through plastic or laminate (2 mm).
6. Standby mode for storage power consumption of 100 mA.
7. Operating power of 55 mA maximum.
8. Reads low, medium, and high density labels.
9. 3" to 30"/second bi-directional scan speed.
10. 1.765 ounces without cord.
11. RS-232C interface format.
12. Up to 4,800 bps baud rate.
14. 7 data bits, 1 stop bit, even parity.

The system of the present invention was specifically designed for use on a U.S. Government installation and includes son, are, using dbase IV and CLIPPER, to support a typical U.S. Government inventory management property book system. The software package allows inventory of an entire building contents or a specific hand receipt holder's equipments.

The mPC is loaded with the following data elements from the Property Book Management System (PBMS) for method selected:

| SERIAL NUMBER DATABASE |
| --- |
| A. FEDERAL STOCK NUMBER |
| B. SERIAL NUMBER |

| SERIAL NUMBER DATABASE -continued |
| --- |
| C. BARCODE NUMBER |
| D. YEAR MANUFACTURED |
| E. BUILDING |
| F. NOMENCLATURE |
| G. ROOM LOCATION |
| H. DATE OF LAST INVENTORY |
| I. MANUFACTURER NAME |
| J. HAND RECERPT HOLDER NUMBER |
| K. COMPONENT INDICATOR |
| L. MANUFACTURER MODEL NUMBER |

When an item to be tracked, using this PBMS, has several associated components, those components can be referenced in the respective item's Serial Number Database by activating the Component Indicator field, K. Examples of component items might be a computer keyboard and monitor that are associated with a particular computer system. The computer is tagged and tracked in the Serial Number Database. The keyboard and monitor, although separate items, are still a part of this system and are therefore tagged and tracked in a related, yet separate Component Item Database that is tied back to the single item, in this case, the computer.

The contents of the Component Item Database are as follows:

| COMPONENT ITEMS DATABASE |
| --- |
| A. FEDERAL STOCK NUMBER |
| B. SERIAL NUMBER |
| C. COMPONENT ITEM STOCK NUMBER |
| D. COMPONENT ITEM SERIAL NUMBER |
| E. COMPONENT ITEM NOMENCLATURE |
| F. YEAR MANUFACTURED |
| G. MANUFACTURER NAME |
| H. HAND RECEIPT NUMBER |
| I. QUANTITY |
| J. MANUFACTURER MODEL NUMBER |

When a barcode is scanned, data elements from the serial number database for that barcode are displayed on the monitor. The user visually verifies the data and makes corrections required by keying in the correct data. If an item has component items, those data elements from the Component Items Database are displayed on the monitor. Changes are made to these component items by keying the correct data.

After scanning is complete, stored data is processed by the Property Management System for reconciliation reports and eventual updating of changed data elements.

Once the "field" inventory process requiring the portable mPC is complete, the data contained on this mPC is then downloaded via the multi-mode serial Port, J2 to the master database located at the home organization. (It should be noted that this master PBMS database resides on a file server mainframe computer at a fixed/permanent location.)

To download the updated database on the mPC to the master database, the bar code scanner 24 is disconnected and a 9 pin, RS-232 interconnect cable is connected to the multi-mode serial port, J2 thus, linking the mPC to the file server mainframe computer. The updated files are then transmitted using a generic communication transfer software package similar to "Kermit". This downlink can also be accomplished via a modem using the same communications software package.

It should be noted that the mPC system as described herein is also capable of connecting to any of several small, portable bar code label printers (Seiko, Avery, Brother, etc.) via its J2 port to create new bar code labels to be printed in the field via any one of the aforementioned printers.

Similar to downloading data to the mother system, the bar code scanner is disconnected and the RS-232 interconnect cable is connected to the J2 port of the mPC and the printer's own RS-232 port. The software drivers for these printers will reside in the mPC memory.

It is to be further noted that while the invention herein has been described with particularity, it is to be understood that the invention is not limited to the precise embodiments disclosed herein and that various modifications can be made by one of ordinary skill in the art without departing from the scope and spirit of the invention as defined by the appended claims.

I claim:

1. Apparatus for retrievably storing information relative to items being electronically scanned by a scanning device for inventory control of said items, said items having a bar code identification label thereon which is read by electronic scanning, said apparatus comprising:

a compact, portable computer including a memory having predetermined information relative to items being scanned by an electronic scanner, said computer including a housing having a plurality of electrical connecters thereon, said housing enclosing first, second, third, and fourth electrically interconnected minimodule circuit boards, said first, second, third and fourth minimodule boards defined respectively as a core module board, a minimodule serial/serial/parallel (SSP) board, a minimodule solid state disk (SSD) board and a minimodule display controller board, said first minimodule board having the first and second of said electrical connectors connected thereto, said second minimodule board having the third of said plurality of electrical connectors connected thereto and said fourth of said minimodule boards having the fourth of said electrical connectors secured thereto;

a handheld electronic scanner releasably electrically connected to said first minimodule board and disposed for scanning a bar code label carried on an item to be electronically scanned, said label containing information relative to said item, said electronic scanner disposed for transmitting signals indicative of said information stored on said label to said computer, said electronic scanner being releasably secured to said first minimodule board through said second electrical connector;

display means releasably electrically connected to said fourth minimodule board, said portable display means carried on the person of an individual and disposed for visually displaying information relative to the items to be electronically scanned, said portable display means being releasably electrically secured to said fourth minimodule board of said computer through said fourth electrical connector;

handheld keypad means releasably electrically connected to said second minimodule board through said third electrical connector to permit accessing of said computer and to provide said information thereto relative to the items being electrically scanned by said electronic scanner;

a power source releasably electrically connected to said first minimodule board through said first connector for supplying electrical power to said computer, said keypad, said electronic scanner, and said display means, said power source defined as a power pack having battery means therein for supplying the electrical power; and support means for supporting said computer housing, said power source, said keypad and said electronic scanner on the person of an individual, said support means having a plurality of compartments, each compartment individually respectively disposed for support of said computer housing, said power source, said keypad and said electronic scanner in a respective said compartment.

2. Apparatus as set forth in claim 1 wherein said display means is a heads-up display device adapted to be worn on the head of an individual with the viewing area of said display device at eye level whereby viewing is accomplished without having to manually hold the display means by hand, and whereby viewing is accomplished without interference to the normal viewing of the viewers surroundings.

3. Apparatus as set forth in claim 1 wherein said power source is a rechargeable power pac.

4. Apparatus as set forth in claim 1 wherein said support means is in the form of a belt to be worn around the waist of the individual by means of a harness.

5. Apparatus as set forth in claim 1 wherein said belt is provided with a plurality of spaced pouches, each respectively disposed for individually carrying said computer, said display means, said bar-code scanner, said keypad, and said power pac.

6. Apparatus as set forth in claim 1 wherein each of said pouches are provided with lids disposed for folded relation respectively over said computer, said display means, said keypad and said power pac.

7. Apparatus as set forth in claim 1 wherein said lid for said computer is provided with an opening therein to respectively direct electrical leads from said computer out of said pouch carrying said computer.

8. Apparatus as set forth in claim 1 wherein said power pac includes: a housing enclosing first circuit means including battery means to controllably energize components of said system including said computer, said bar code scanner, said keypad terminal and said visual display; second circuit means to permit charging of said battery means, and; third circuit means to permit said battery means to be completely discharged prior to said charging of said battery means.

9. Apparatus as set forth in claim 1 including switch means selectably connectable from an off position to connected positions between said first and second circuit means to respectively permit charging of said battery means or energization of said components.

10. Apparatus as set forth in claim 1 wherein said housing is provided with first and second connector means for electrically connecting said battery to a load to permit controlled, complete discharging of said battery means prior to charging said battery.

* * * * *